United States Patent [19]
Ishikawa

[11] Patent Number: 5,893,453
[45] Date of Patent: Apr. 13, 1999

[54] CASSETTE ACCOMMODATION CASE

[75] Inventor: Ko Ishikawa, Miyagi, Japan

[73] Assignee: Sony Corporation, Japan

[21] Appl. No.: 08/845,461

[22] Filed: Apr. 25, 1997

[30] Foreign Application Priority Data

May 24, 1996 [JP] Japan .................................. 8-130129

[51] Int. Cl.$^6$ .................................................... B65D 25/10
[52] U.S. Cl. .................. 206/232; 206/387.1; 206/459.5
[58] Field of Search ........................... 206/387.1, 387.13, 206/308.1, 311, 312, 313, 459.5, 232, 309

[56] References Cited

U.S. PATENT DOCUMENTS

| | | |
|---|---|---|
| 4,863,026 | 9/1989 | Perkowski . |
| 5,544,741 | 8/1996 | Fantone et al. ...................... 206/308.1 |
| 5,588,526 | 12/1996 | Fantone et al. ...................... 206/308.1 |

FOREIGN PATENT DOCUMENTS

| | | |
|---|---|---|
| 0 229 419 | 7/1987 | European Pat. Off. . |
| 0 493 845 | 7/1992 | European Pat. Off. . |
| 2 092 109 | 8/1982 | United Kingdom . |
| 2 298 188 | 8/1996 | United Kingdom . |
| WO 95 26916 | 10/1995 | WIPO . |

*Primary Examiner*—Jacob K. Ackun
*Attorney, Agent, or Firm*—Ronald P. Kananen

[57] ABSTRACT

A cassette accommodation case for accommodating therein a cassette containing an information recording medium, a card or the like includes a case body in which the cassette is accommodated, an openable and/or closeable lid molded of transparent plastic, having a lenticular lens on its external surface, and rotatably supported by the case body, a card to be inserted between an inner surface of the lid and the cassette and on which a stereoscopic synthetic picture is printed, the picture forming a 3-dimensional picture when it is seen through the lenticular lens, and a supporting portion formed in the case body so as to support the card such that its printed surface is held at a predetermined portion with respect to the lenticular lens of the lid when the lid is closed.

11 Claims, 7 Drawing Sheets

CASSETTE ACCOMMODATION CASE

BACKGROUND OF THE INVENTION

1. Field of the Invention

The present invention relates to a cassette accommodation case preferable for accommodating a tape cassette such as a compact cassette and the like for audio use, and more particularly to a cassette accommodation case having a display function enabling an index card on which a stereoscopic synthetic picture is printed to be seen as a 3-dimensional image (3D) through a lenticular lens.

2. Description of the Related Art

A conventional cassette accommodation case having this kind of display function will be described with reference to FIGS. 5 and 6.

FIG. 1 is a perspective view showing a cassette accommodation case, a compact cassette, and an index card in a separated state. FIG. 2 is a sectional view of a state in which the compact cassette and the index card are accommodation in the cassette accomodated case.

The cassette accommodation case is made of plastic moldings and comprises a case body 1 and a case lid portion 3 which can be opened and closed about a hinge portion 2 as a fulcrum for rotation. A bottom of the case body 1 has a pair of reel rotation stoppers 4, 4 which engage with reel hub apertures of a cassette when a compact cassette which will b e described later is accommodated there in. Further, cassette supporting ribs 5, 5 are formed on a wall face 1a of the case body 1 on an opening end side opposite to the hinge portion 2 of the case body 1.

A cassette accommodation pocket 6 is provided on a back face of the case lid portion 3 at its hinge portion 2 side and a vertical stripe shaped lenticular lens face 7 is formed entirely on an external surface of the case lid portion 3. For this reason, the case lid portion 3 is molded of at least transparent plastic.

A compact cassette is indicated by reference numeral 8. The compact cassette 8 contains therein a pair of tape reels (not shown) which are rotatable and reel hub apertures 10, 10 coincide with a pair of opening portions 9, 9 formed through the cassette case. Further, the compact cassette 8 comprises a swelling portion 11 formed in a trapezoidal shape so as to form a tape mouth at one side portion thereof.

On the other hand, an index card is indicated by reference numeral 12. A folded piece 14 is formed through a folding line 13 at one end side of the index card 12. A stereoscopic synthetic picture 15 is printed on one surface of the index card 12. An index marking area 16 is printed on the other surface thereof as shown in FIG. 3.

Then, with the stereoscopic synthetic picture 15 of the index card 12 in contact with a rear face of the case lid portion 3 of the cassette accommodation case, the folding piece 14 is incorporated in a bottom portion of the cassette accommodation pocket 6 and a cassette label 17 (see FIG. 2) is accommodated so as to overlap the index card 12. Successively, the compact cassette 8 is accommodated in the cassette accommodation pocket 6 in order from the swelling portion 11 side. By closing the case lid portion 3 to the case body 1 side, a state in which the compact cassette 8 is accommodated as shown in FIG. 2 is presented.

The compact cassette 8 in the accommodation condition is supported by the cassette supporting ribs 5 of the case body 1 while the reel hub apertures 10 are engaged by the reel rotation stoppers 4 to prevent the reels from being rotated so that the cassette is accommodated stably.

The stereoscopic synthetic picture 15 of the index card 12 accommodated in the cassette accommodation case together with the compact cassette 8 can be seen as a 3-dimensional image through the lenticular lens face 7 formed on the external surface of the case lid portion 3. For this 3-dimensional image to be seen clearly, the stereoscopic synthetic picture 15 needs to be in close contact with the rear surface of the case lid portion 3 with no clearance.

By the way, in the above cassette accommodation case, it is necessary to provide a predetermined space between the top face of the compact cassette 8 and the case lid portion 3 because of a tolerance in dimension of the compact cassette 8 to be accommodated and deviations in thickness of the index card 12 and the cassette label 17. For the reason, although the index card 12 which is accommodated between the top face of the compact cassette 8 and the case lid portion 3 can be made to firmly contact the rear face of the case lid portion 3 on the swelling portion 11 side of the compact cassette 8 because the space between the compact cassette 8 and the case lid portion 3 is small, there occurs a large space relative to the case lid portion 3 in a portion opposite to the swelling portion 11. Further, there is no member for supporting the index card 12. Thus, as shown in FIG. 2, the index card 12 is warped so that if there occurs a gap relative to the rear face of the case lid portion 3, the operation of the lenticular lens is not exerted and an 3-dimensional image effect of the stereoscopic synthetic picture 15 is lost. As a result, a product performance as a cassette accommodation case is reduced.

When a user writes a content of description into the index marking area 16 printed on the rear face of the index card 12, folded back this index marking area 16 to the front side and then accommodates it in the cassette accommodation case such that it can be seen through the case lid portion 3, if the opening end side of the index card 12 is warped so that there occurs a gap relative to the case lid portion 3, the content of the description on the index marking area 16 cannot be read clearly by an effect of the lenticular lens surface 7.

In addition to the accommodation case for the compact cassettes, for example, some types of compact disk (CD) accommodation cases have a function for making the index card to contact the case lid portion on which the lenticular lens surface is formed and to support the former. However, a structure of a mold for forming the case lid portion becomes complicated so that the mold cost becomes expensive.

SUMMARY OF THE INVENTION

Accordingly, the present invention has been proposed to solve the above described problem. An object of the present invention is to provide a cassette accommodation case in which an entire surface of the card can be made to contact the case lid portion having a lenticular lens by only providing a conventional cassette accommodation case with a simple card supporting function so that an effect of the 3-dimensional image is never lost on the entire surface of the card.

To solve the above described problem, according to the present invention, there is provided a cassette accommodation case wherein a cassette is accommodated with a trapezoidal shaped swelling portion thereof located on the hinge portion side and a card in which a stereoscopic synthetic picture is printed is accommodated so as to contact the case lid portion such that the stereoscopic synthetic picture of the card can be seen as a 3-dimensional image through a lenticular lens surface formed on an external surface of the case lid portion side, the cassette accommodation case further comprising a card supporting portion having such a height as to form substantially the same space as a thickness of the card between the card supporting portion and a rear face of the case lid portion, in the case body on a case opening end side which is opposite to the hinge portion at least at two positions.

With this structure, on a side of the trapezoidal shaped swelling portion of the cassette, the card can be supported in contact with the rear surface of the case lid portion by that swelling portion and a portion of the card on a side opposite to the swelling portion of the cassette can be supported by the card supporting portion so that it can be made in contact firmly with the rear surface of the case lid portion. Consequently, the entire surface of the card can be made in contact with the case lid portion.

Further, the card supporting portion is formed by a pin or a rib vertically raised from a bottom of the case body. Consequently, by supporting the card by tip end faces of the card supporting portions, it is possible to make the card effectively contact the rear surface of the case lid portion.

The card supporting portion is provided on side walls of the case body and nearer the case opening end side relative to the reel rotation stoppers. Consequently, a portion of the card easy to be warped is supported by the card supporting portions so that it can be made to contact the rear surface of the case lid portion.

Further, the card supporting portion is provided at two positions with a distance larger than half the width of the card, on the case opening end side. Consequently, the card portion easy to be warped on the opening end side is supported by the two card supporting portions so that the card can be made to closely contact the rear surface of the case lid portion.

DESCRIPTION OF THE PREFERRED EMBODIMENT

Hereinafter, an embodiment of the cassette accommodation case according to the present invention will be described by taking an accommodation case for a compact cassette for audio use as an example with reference to the accompanying drawings.

Figure 1:
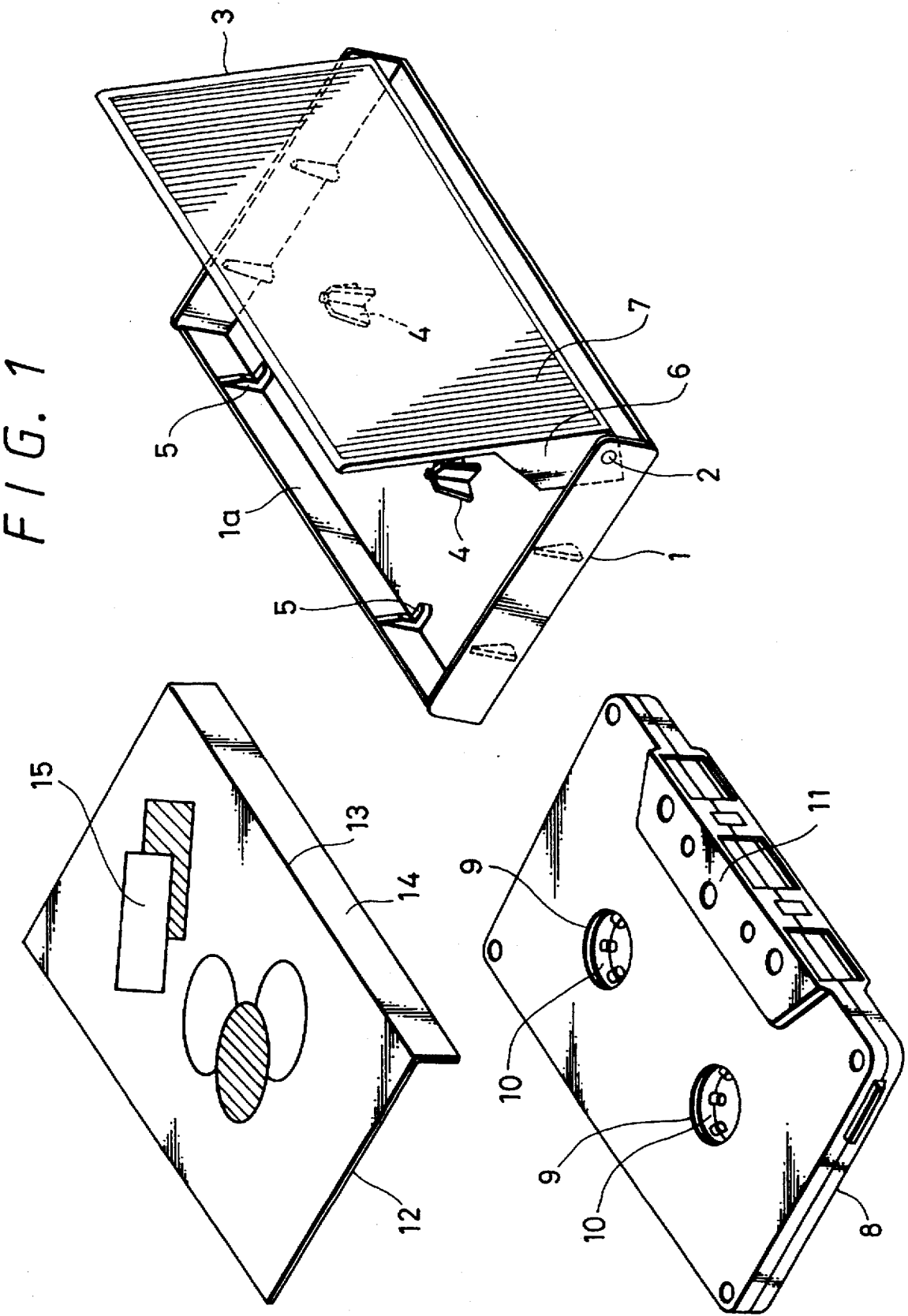
FIG. 1 is a perspective view of a conventional cassette accommodation case, a cassette and an index card in a separated state.
Figure 2:
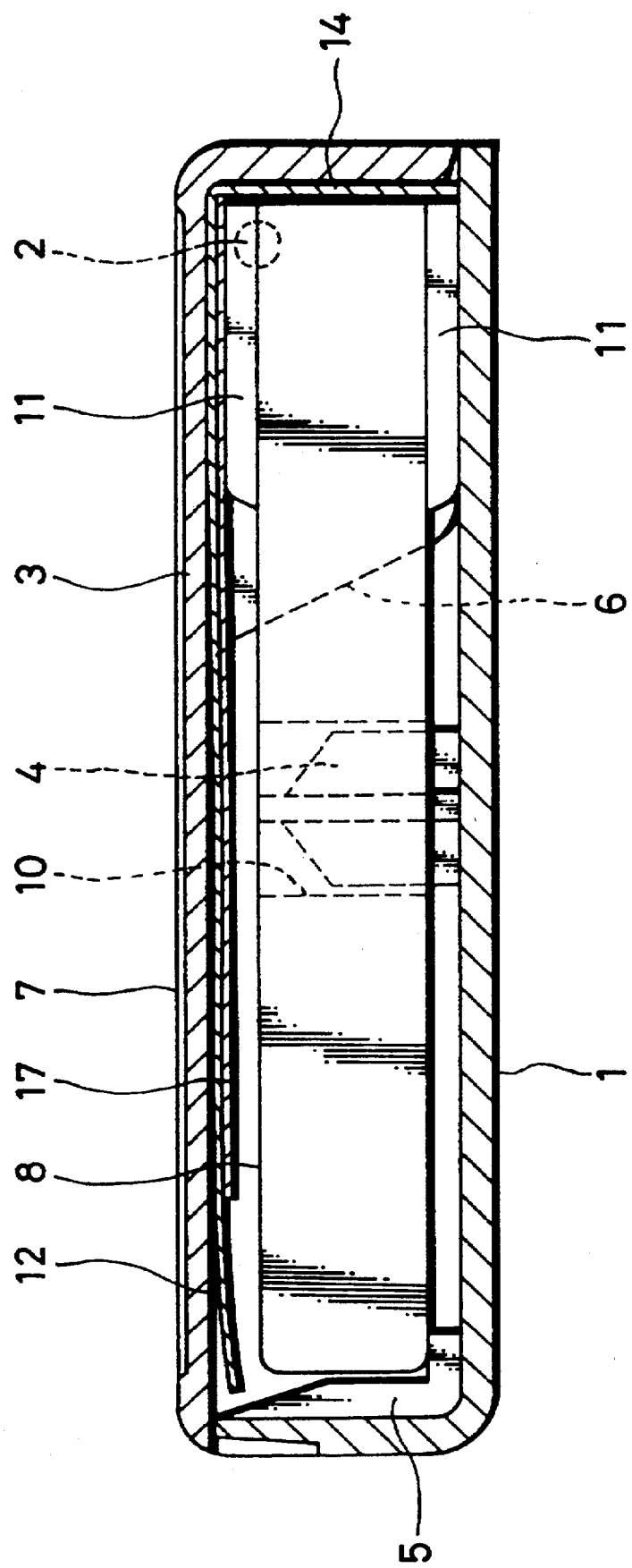
FIG. 2 is an enlarge sectional view of the conventional cassette accommodation case in which the cassette and the index card are accommodated.
Figure 4:
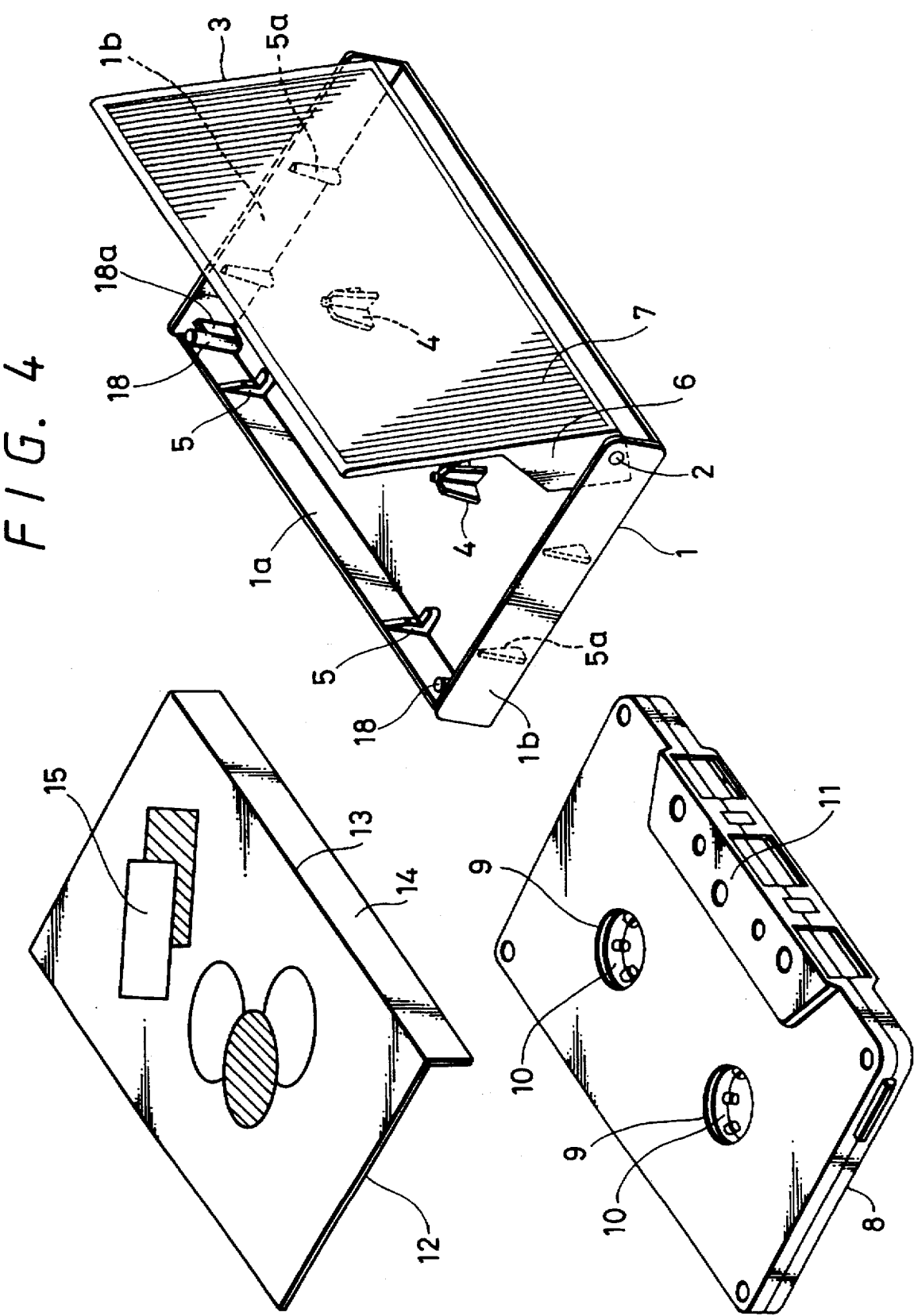
FIG. 4 is a perspective view showing a cassette accommodation case, a cassette and an index card according to the present invention in a separate state.
Figure 5:
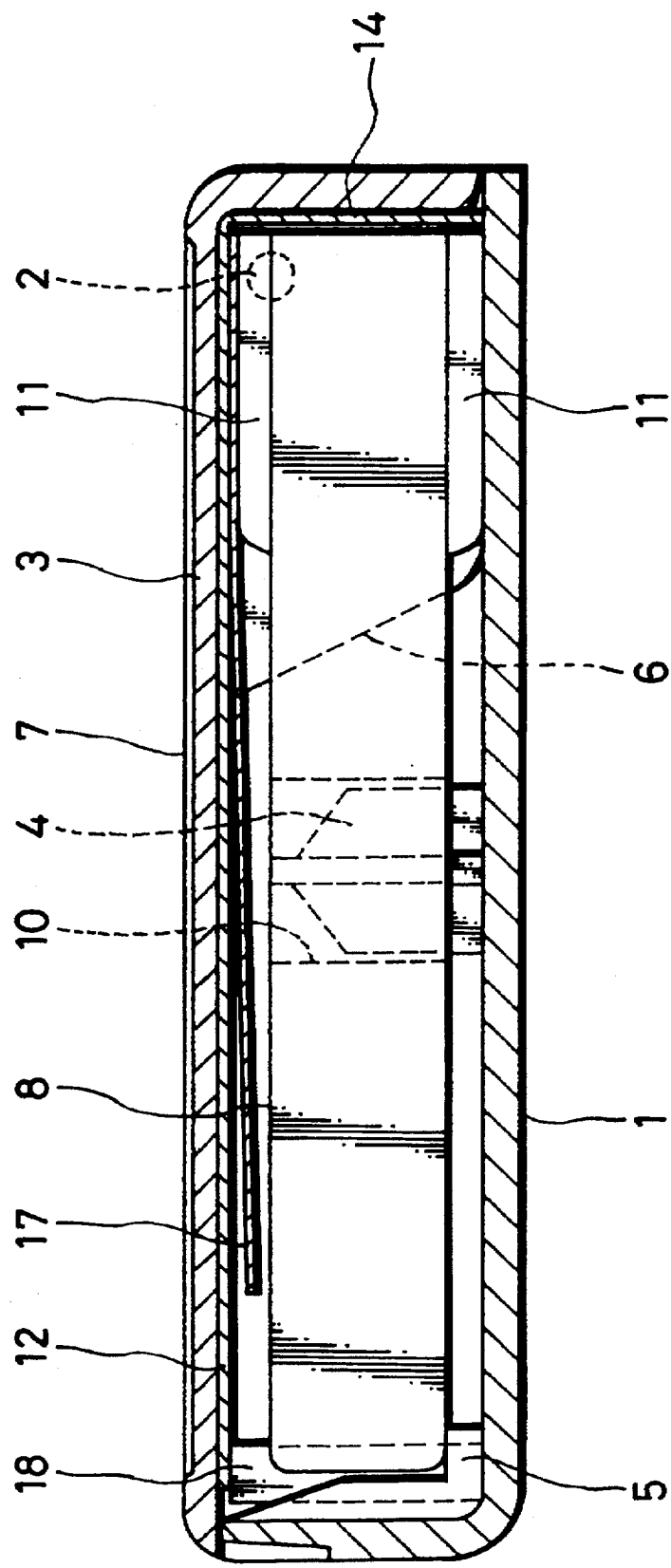
FIG. 5 is an enlarged sectional view of the cassette accommodation case shown in FIG. 4 in which the cassette and the index card are accommodated.

FIG. 4 is a perspective view showing a cassette accommodation case, a compact cassette and an index card in a separated state. FIG. 5 is a sectional view of a state in which the compact cassette and the index card are accommodated in the cassette accommodation case. In FIGS. 4 and 5, the same reference numerals are attached to the same components as described in FIGS. 1 and 2.

The cassette accommodation case is made of plastic moldings and comprises a case body 1 and a case lid portion 3 which can be opened and closed about a hinge portion 2 as a fulcrum for rotation. A bottom of the case body 1 has a pair of reel rotation stoppers 4, 4 with which reel hub apertures of the cassette engage when a compact cassette which will be described later is accommodated therein. Further, cassette supporting ribs 5, 5 are formed on a wall face 1a of the case body 1 on an opening end side opposite to the hinge portion 2 side. Reference numeral 5a designates reinforcement ribs for reinforcing side walls 1b of the case body 1.

A cassette accommodation pocket 6 is provided on a back surface of the case lid portion 3 on the hinge portion 2 side and a vertical stripe-shaped lenticular lens face 7 is formed entirely on an external surface of the case lid portion 3. For the reason, the case lid portion 3 is molded of at least transparent plastic.

A compact cassette is indicated by reference numeral 8. The compact cassette 8 includes therein a pair of tape reels, not shown, which are rotatable and reel hub apertures 10, 10 coincide with a pair of opening portions 9, 9 formed through the cassette case. Further, the compact cassette 8 comprises a swelling portion 11 formed in trapezoidal shape so as to form a tape mouth at one side portion thereof.

Figure 3:
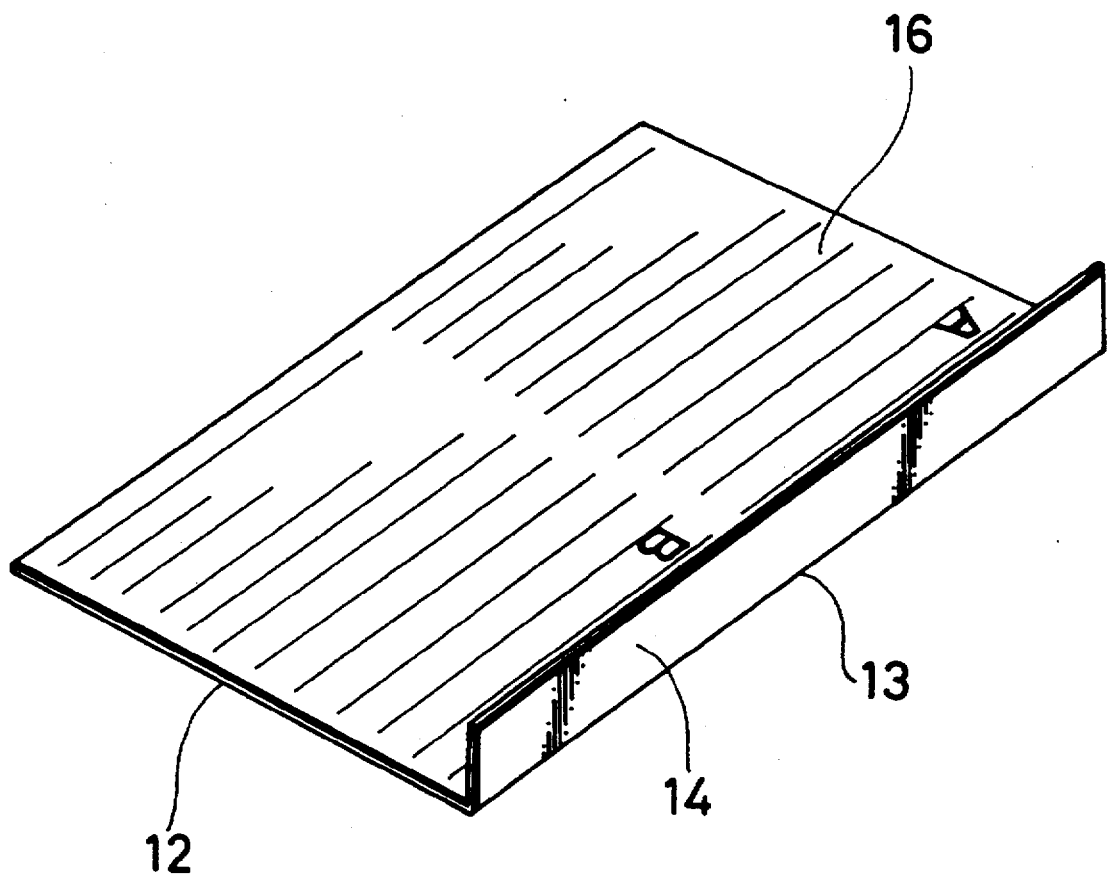
FIG. 3 is a perspective view of a rear surface of the index card.

On the other hand, an index card is indicated by reference numeral 12. A folded piece 14 is formed through a folding line 13 at one side of the index card 12. A stereoscopic synthetic picture 15 is printed on one surface of the index card 12. An index marking area 16 is printed on the other surface thereof as shown in FIG. 3.

Then, with the stereoscopic synthetic picture 15 of the index card 12 in contact with a rear face of the case lid portion 3 of the cassette accommodation case, the folding piece 14 is incorporated in a bottom portion of the cassette accommodation pocket 6 and a cassette label 17 (see FIG. 5) is accommodated so as to overlap the index card 12. Successively, the compact cassette 8 is accommodated into the cassette accommodation pocket 6 from the swelling portion 11 thereof. By closing the case lid portion 3 to the case body 1 side, a state in which the compact cassette 8 is accommodated as shown in FIG. 5 is presented.

As shown in FIG. 4, card supporting portions 18, 18 which are a major part of the present invention are provided at both corners of the case body 1 of the above described cassette accommodation case, on its opening end side in which the cassette supporting ribs 5, 5 are formed and which is opposite to the hinge portion 2.

The card supporting portions 18 are pin shaped members planted up vertically from a bottom of the case body 1 according to the present embodiment and supported by side walls through ribs 18a. The card supporting portions 18 are set to have a height so as to produce a space substantially the same as the thickness of the index card 12 between a top end thereof and the rear surface of the case lid portion 3 when it is closed. A thickness of the compact cassette 8 is regulated to be 8.9 mm maximum according to the IEC standard. Thus, the card supporting portions 18 are higher than the upper surface of the compact cassette 8 supported by supporting faces of the cassette supporting ribs 5.

Further, a length of the folding piece 14 in the folding direction of the index card 12 is set so as to substantially coincide with a height of space formed by the case body 1 and the case lid portion 3.

The card supporting portions 18 may be independently disposed without the ribs 18a and may be formed in rib-shaped members, not shown, as well as in the pin-shaped members.

In the cassette accommodation case according to the present invention, in a state in which the compact cassette 8 is accommodated together with the index card 12 as shown in FIG. 5, a card portion of the index card 12 is made to firmly contact the rear face of the case lid portion 3 by the swelling portion 11 on a side of the trapezoidal shaped swelling portion 11 of the cassette, and a card portion of the index card 12 at the opening end side which is opposite to the swelling portion 11 side is supported by the card supporting portions 18, 18 such that it can be made in contact with the rear face of the case lid portion 3. Consequently, the entire surface of the index card 12 can be made in contact with the rear face of the case lid portion 3 without being warped. Thus, the whole of the stereoscopic synthetic picture 15 of the index card 12 can be seen as a clear 3-dimensional image through the lenticular lens surface 7.

An installation position of the card supporting portion 18 is not always restricted to a position shown in the embodiment. For example, if the card supporting portions are provided on the side wall 1b sides of the case body 1, they have only to be provided on a side of the case opening end side with respect to the reel rotation stoppers 4. On the other hand, if the card supporting portions are provided on the wall face 1a on the case opening end side, and if they are provided at two points with a distance larger than a width of half the index card 12, the entire surface of the index card 12 can be made to effectively contact the rear surface of the case lid portion 3.

Figure 6:
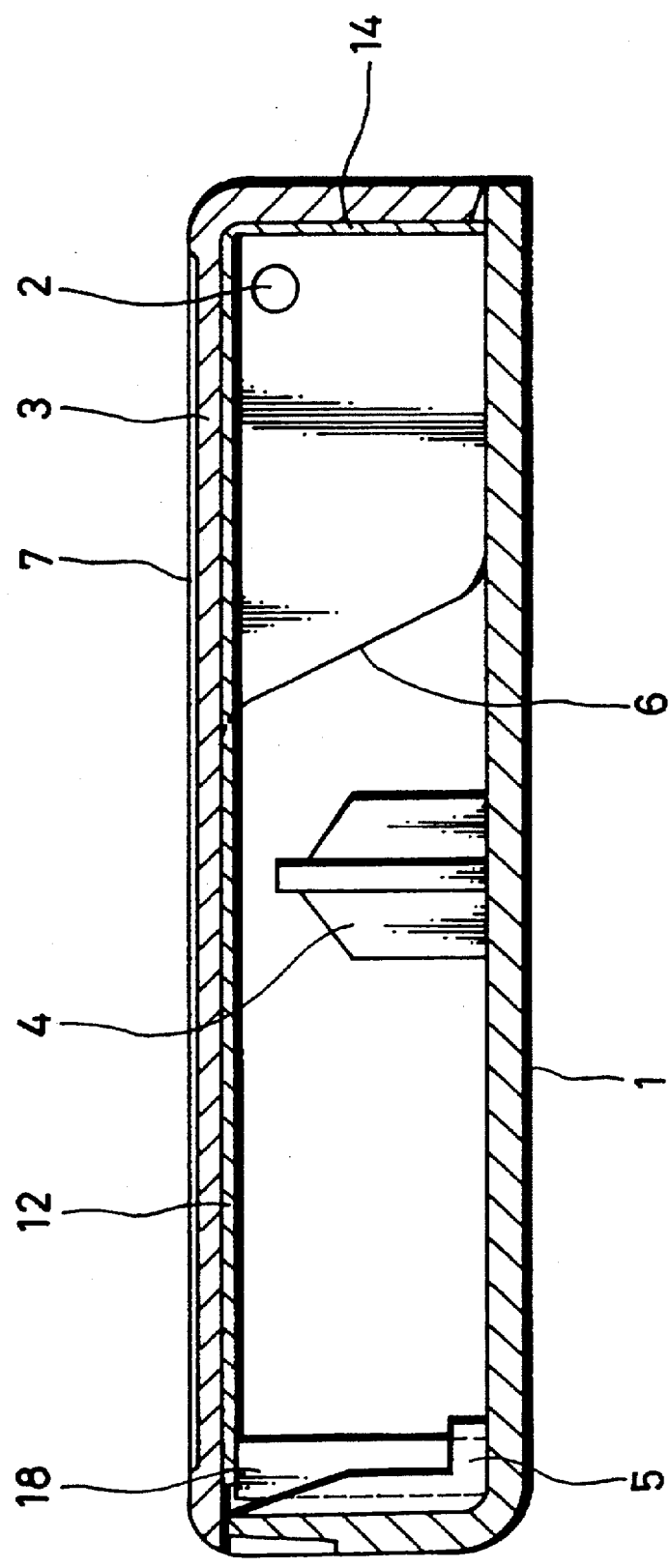
FIG. 6 is a sectional view of the cassette accommodation case shown in FIG. 4 in which no cassette is accommodated.

Although in the above-mentioned embodiment such a case that the compact cassette 8 is accommodated in the cassette accommodation case has been described, even if the compact cassette 8 is removed from the accommodation case as shown in FIG. 6, the entire face of the stereoscopic synthetic picture 15 of the index card 12 can be seen as a clear 3-dimensional image.

That is, because the index card 12 is so structured that a length of the folded piece 14 formed through the folding line 13 is set to be substantially the same as the height of space formed by the case body 1 and the case lid portion 3, the folded piece 14 serves as a supporting piece for the index card 12. Thus, the index card 12 can be made in contact with the rear face of the case lid portion 3. Further, because a portion of the index card 12 located at the case opening end side is supported by the card supporting portions 18, 18, the entire stereoscopic synthetic picture 15 of the index card 12 can be seen as a clear 3-dimensional image.

The index marking area 16 is printed on the rear face of the index card 12 as shown in FIG. 3. If a user folds back the index marking area 16 in which he writes a content of recording to the front side and accommodates it such that the content can be seen through the case lid portion 3, the entire surface of the index card 12 can be made to contact the rear face of the case lid portion 3 like the above case so that the content of the recording can be read clearly.

Because the card supporting portions 18 are planted vertically upwards from the bottom of the case body 1, the card supporting portions 18 can be molded easily at the same time with the case body 1 by means of a simple mold. This is achieved by attaching mold parts for molding the card supporting portions to a conventional mold and therefore the mold necessary for the molding can be produced at low cost.

Although the case in which two pieces of the card supporting portions 18 are disposed at the corners on the opening end side of the case body 1 has been described in the above embodiment, other than the corners, it is permissible to dispose the two card supporting portions 18, 18 on the wall face 1a with a distance larger than half the width of the index card 12. Alternatively, it is permissible to provide two card supporting portions 18, 18 on the corners and further provide another card supporting portion in the middle of them so that three card supporting portions are employed. Further, it is permissible to provide two card supporting portions 18, 18 on the corners and further provide one card supporting portion approximately in the middle of each of the side wall faces 1b, 1b so that four card supporting portions are employed.

Figure 7:
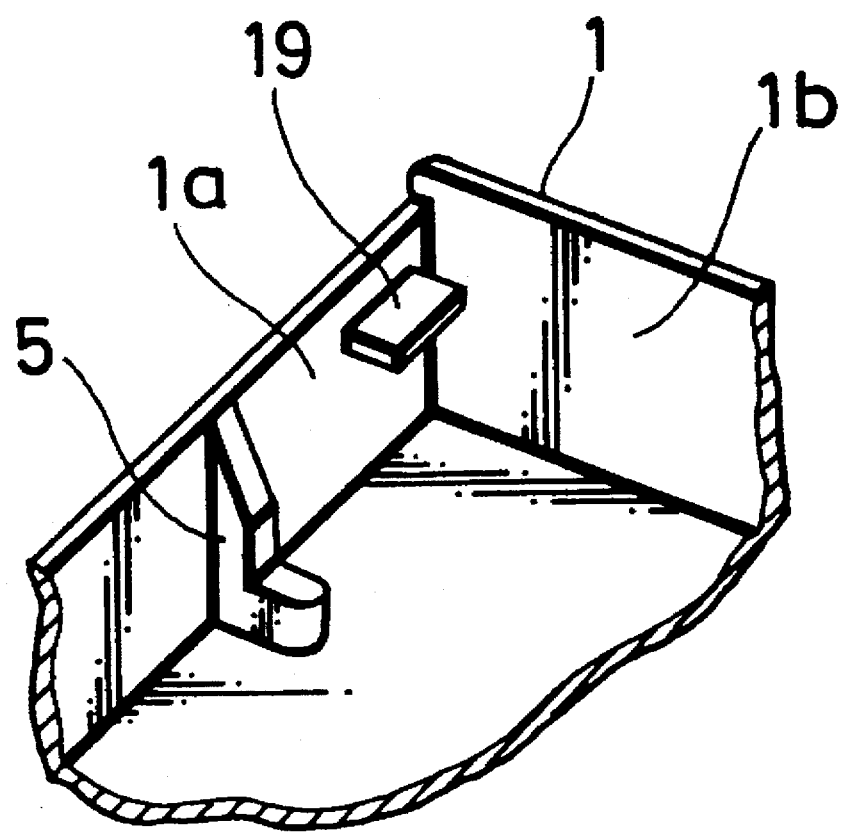
FIG. 7 is a perspective view of a major part of another example of a card supporting portion of the cassette accommodation case of the invention.

Although the card supporting portions 18 described above are planted vertically upwards from the bottom of the case body 1, it is permissible to form a rib-shaped card supporting portion 19 projecting horizontally from the wall face 1a on the opening end side of the case body 1 as shown in FIG. 7 or horizontally from the side wall face 1b not shown. In these cases, the function of the card supporting portion can be achieved.

As described above, in the cassette accommodation case according to the present invention, in which the cassette is accommodated with its trapezoidal shaped swelling portion on the hinge portion side and the card in which the stereoscopic synthetic picture is printed is accommodated so as to face the case lid portion so that the stereoscopic synthetic picture of the card can be seen as a 3-dimensional image through the lenticular lens surface formed on the external surface of the case lid portion, at least two card supporting portions for forming a space having substantially the same thickness as the thickness of the card between the card supporting portions and the rear surface of the case lid portion are provided in the case body on the case opening end side which is opposite to the hinge portion consequently, the entire surface of the card can be made to effectively contact the case lid portion, so that the entire stereoscopic synthetic picture of the index card can be seen as a clear 3-dimensional image through the lenticular lens surface.

Further, because the card supporting portions are formed by pins or ribs vertically raised from the bottom of the case body, the card supporting portions can be molded easily together with the case body by means of a simple mold so that the production cost can be suppressed.

Further, because the card supporting portions are disposed on the side wall sides of the case body, near the case opening end side relative to the reel rotation stoppers, the card portion on the opening end side which is warped easily can be supported by the card supporting portions so that it can be made to effectively contact the rear surface of the card lid portion.

Further, the card supporting portions are provided at two positions with a distance larger than half the width of the card, on the case opening end side. Consequently, the card portion on the opening end side easy to be warped can be supported by the two card supporting portions so that the card can be made to effectively contact the rear surface of the case lid portion.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A cassette accommodation case for accommodating therein at least a cassette containing an information recording medium, and a card, comprising:
    a case body for accommodating the cassette therein and having a pair of reel rotation stoppers;
    an openable and/or closeable lid molded of transparent plastic, having a lenticular lens formed on its external surface, and rotatably supported by said case body;
    a card adapted to be inserted between an inner surface of said lid and the cassette and on which a stereoscopic synthetic picture is printed, said card being folded in an L-letter shape seen from its side, a width of its folded portion being substantially equal to a height of an inner space of said accommodation case, and said folded portion being accommodated in said accommodation case at its rotation support side; and
    a supporting portion provided on said case body for supporting said card such that its printed surface is held at a predetermined position with respect to said lenticular lens of said lid when the lid is closed.

2. A cassette accommodation case as claimed in claim 1, wherein said card supporting portion is made of a pin or rib and a free end portion of said card is supported on a top end of said pin or rib.

3. A cassette accommodation case as claimed in claim 1, wherein said picture forms a 3-dimensional picture when viewed through said lenticular lens.

4. A cassette accommodation case as claimed in claim 1, wherein said picture entirely contacts said inner surface of said lid.

5. A cassette accommodation case as claimed in claim 1, wherein an entire surface of said card contacts said inner surface of said lid.

6. A cassette accommodation case as claimed in claim 1, wherein said supporting portion is provided at least at two positions which are spaced apart by a distance greater than half a width of said card for preventing warping of said card.

7. A cassette accommodation case as claimed in claim 1, wherein said case body has an opening end side and said card supporting portion is provided on at least one side wall of said case body such that said side wall is closer to said opening end side than said reel rotation stoppers.

8. A cassette accommodation case as claimed in claim 1, wherein said supporting portion has a predetermined height that defines a space relative to said lid that is substantially equal to a thickness of said card when said lid is closed.

9. A cassette accommodation case as claimed in claim 1, wherein said case body includes a side wall and a support rib on said side wall adapted to restrict the cassette at a predetermined position, and said card supporting portion is provided in a space region formed between an inner wall surface of said case body and the cassette when the cassette is accommodated.

10. A cassette accommodation case as claimed in claim 1, wherein said card supporting portion is formed such that a pin or rib is planted upward from an inner bottom of said case body and said card is supported on a top end of said pin or rib.

11. A cassette accommodation case as claimed in claim 1, wherein said card portion is formed such that a rib is projected from an inner side wall of said case body in a horizontal direction and said card is supported on an upper surface of said rib.

* * * * *